L. R. EWART.
HEADLIGHT CONTROLLER FOR VEHICLES.
APPLICATION FILED MAR. 25, 1916.
1,198,712.
Patented Sept. 19, 1916.
2 SHEETS—SHEET 2.
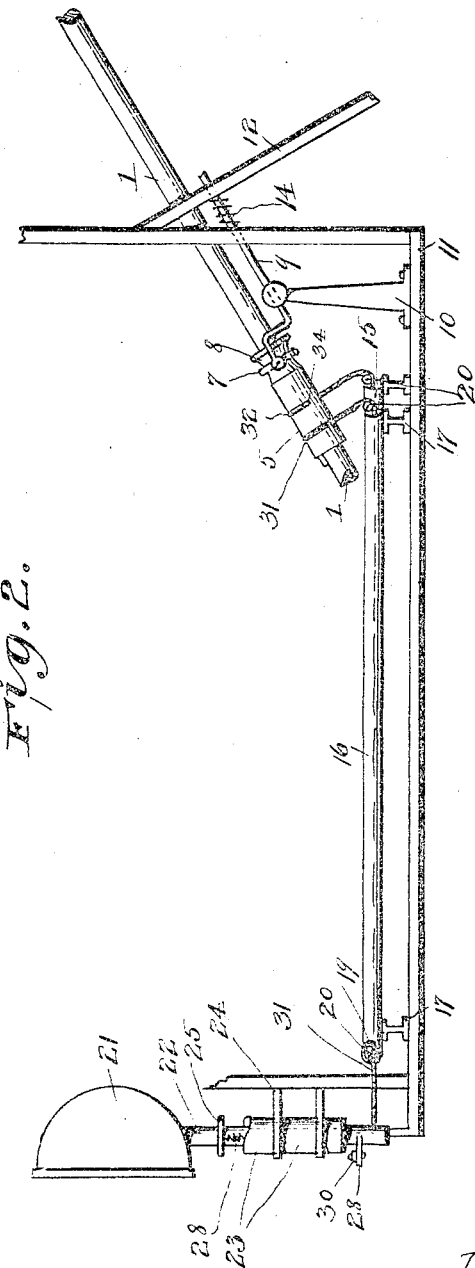
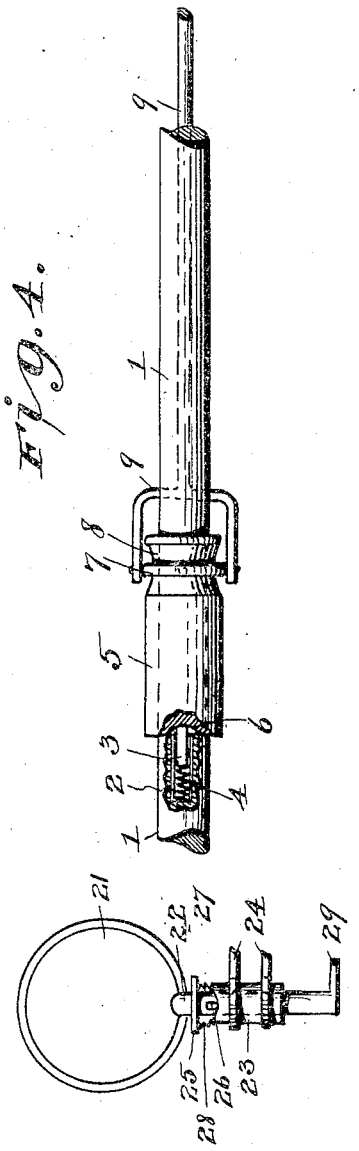
Inventor
Lewis R. Ewart,
By James K. Polk
Attorney

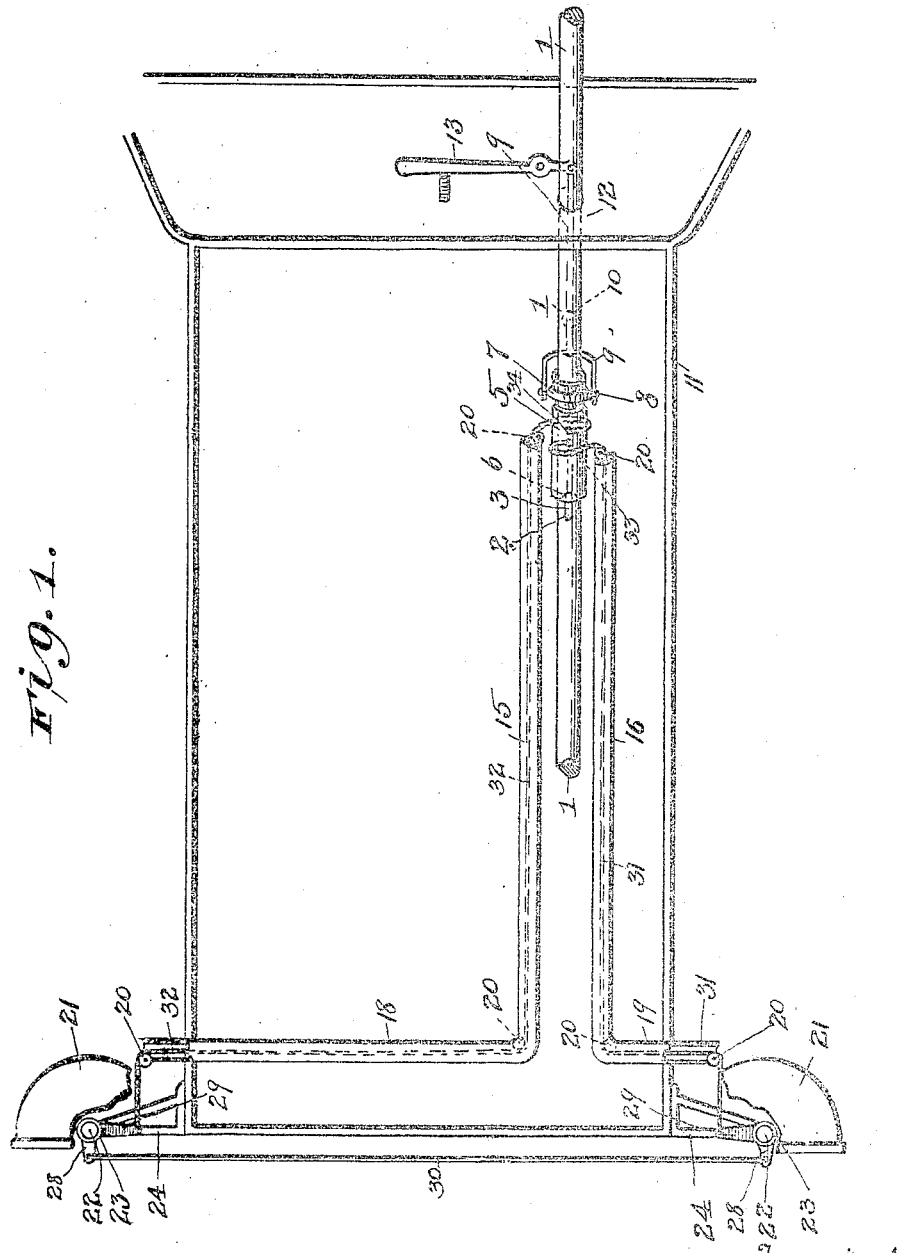

UNITED STATES PATENT OFFICE.

LEWIS R. EWART, OF CODY, WYOMING.

HEADLIGHT-CONTROLLER FOR VEHICLES.

1,198,712.

Specification of Letters Patent.

Patented Sept. 19, 1916.

Application filed March 25, 1916. Serial No. 86,605.

*To all whom it may concern:*

Be it known that I, LEWIS R. EWART, a citizen of the United States, residing at Cody, in the county of Park and State of Wyoming, have invented certain new and useful Improvements in Headlight-Controllers for Vehicles, of which the following is a specification.

My invention relates to an improvement in headlight-controllers for vehicles, and more particularly to automatic headlight-controllers adapted to be operated by a rope or cable.

The invention consists in the several features and in the operation, combination and arrangement of the several features, as more particularly hereinafter described and claimed.

The object of the invention is to provide an automobile headlight-controller by means of which the headlights are automatically turned in accordance with the angle taken by the front steering-wheels of the automobile, thereby causing the rays of light radiating from the headlights to be directed in the course being followed by the automobile, in accordance with the position of the steering-wheels, which insures the full illumination of that portion of the roadway which is being approached and which is to be traveled over, which is much more satisfactory than the present arrangement, commonly in use, in which the headlights are fixed on the front of the chassis of the automobile.

A further object of my invention is to provide a headlight-controller which, by directing the rays of light in the direction in which the automobile is proceeding, will prevent accidents, or at least reduce them to a minimum degree.

A further object of my invention is to provide a headlight-controller which will be automatically operated by means, or through the medium, of a steering shaft or post.

A further object of my invention is to provide a headlight-controller which is operated by means of a rope or cable operatively connected to the steering-shaft or post.

A still further object of my invention is to provide a headlight-controller which is simple, inexpensive, and durable in construction, and easy and effective in operation.

Referring to the drawings, Figure 1 is a top plan view, partly broken away; Fig. 2, a side view; Fig. 3, a rear view of one of the headlights; Fig. 4, a plan view, partly in section, of the device for throwing the headlights out of operation with the steering-wheel shaft or post.

In the drawings, in which like reference characters denote like parts throughout the several views, 1 represents the usual well-known type of steering-wheel shaft of an automobile provided with a casing 2, having a spring-controlled bolt, 3 being the bolt and 4 the spiral spring controlling the movement of the same.

A longitudinally-slidable sleeve 5 is mounted on the steering-wheel shaft 1, and its lower edge is provided with a curved notch 6, adapted to be engaged by the bolt 3, while the exterior of its upper end is provided with a ring 7, mounted in an annular depression 8.

In order to engage and disengage the sleeve 5 from the bolt 3, a suitable rod 9 is provided, which is slidably mounted in the post 10, rising from the frame 11 of the automobile, the lower end of the rod being pivoted to the ring 7 and the upper end passing through the foot-board or rest 12 and adapted to be operated by means of a lever 13, which may be operated by hand or foot as desired, and 14 is a spiral spring surrounding the rod 9 and arranged, in connection with the foot-board, to retain the sleeve 5 in its normal position in engagement with the bolt 3.

15 and 16 are two tubes supported on brackets 17, rising from the frame of the automobile, the lower end of the tube 15 being bent and extended laterally, as at 18, and the lower end of the tube 16 being bent and extended laterally, as at 19. Each tube is provided with a number of anti-friction rollers 20.

The headlights 21, preferably two in number, are each mounted on a vertical shaft 22, which in turn is rotatively mounted in a vertical sleeve 23, supported in brackets 24, fixed to the automobile frame. The upper part of the shaft 22 is provided with an integral ring 25 and just below said ring with a laterally-projecting lug 26. The upper edge of the sleeve 23 is curved rearwardly and downwardly, as at 27, and the lug 26 engages and bears on said curved edge, and spiral springs 28, connected to the ring 25 and to the sleeve 23, keep the lug 26 in constant engagement with the curved edge of the sleeve, said spiral springs serving to provide or compensate for any vertical movement of the shaft and also to automatically return the headlights to their normal position facing forward. The lower end of each of the shafts 22 is provided with an upper and a lower lug 28 and 29, respectively, and 30 is a laterally-extending rod pivotally connected to said lugs 28.

Ropes or cables 31 and 32, made of any suitable material, operatively connect the sleeve 5 with the lower lugs 29 of the shaft 22. One end of the cable 31 is secured to the sleeve 5 at the point 33 and extends through the tube 16 over the rollers 20 and its other end is secured to the lower lug 29 of the shaft 22, at the left-hand side of the automobile, while one end of the cable 32 is secured to the sleeve 5, at the point 34, and extends through the tube 15 over the rollers 20 and its other end is secured to the lower lug 29 of the shaft 22 at the right-hand side of the automobile.

The operation of the device is so evident that it is not thought necessary to recite the same.

I do not desire to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

Having thus described my invention, what I claim is—

1. In a headlight-controller, stationary sleeves, shafts slidably mounted therein having means for engaging the upper edges of the said sleeves, headlights and collars, resilient means outside of said sleeves connecting said collars and sleeves and adapted to turn the said shafts and also move them vertically, a steering-wheel shaft and means operatively connecting said shafts carrying the headlights with said steering-wheel shaft, substantially as shown and described.

2. In a headlight-controller, stationary sleeves, shafts mounted in said sleeves, having lugs engaging and bearing on the upper edges of said sleeves, headlights and collars, springs outside the said sleeves connecting said collars and sleeves and adapted to turn the said shafts and also move them vertically, a steering-wheel shaft and means for operatively connecting said shafts carrying the headlights with said steering-wheel shaft, substantially as shown and described.

3. In a headlight-controller, stationary sleeves having curved upper edges, shafts slidably mounted in said sleeves having lugs for engaging the curved edges of said sleeves, headlights and collars, resilient means outside the said sleeves connecting said sleeves and collars, said resilient means adapted to turn said shafts and also move them vertically, a steering-wheel shaft, and means operatively connecting said shafts with said steering-wheel shaft, substantially as shown and described.

4. In a headlight-controller, stationary sleeves having curved recesses in their upper edges, shafts slidably and rotatively mounted in said sleeves, having laterally projecting lugs which are normally seated in the curved recesses in the upper edges of the sleeves, headlights, collars integral with said shafts, springs connected at their upper ends to said collars and at their lower ends to said sleeves and adapted to return the said shafts to their normal positions, substantially as shown and described.

5. In a headlight-controller, stationary sleeves having cam-shaped upper edges, rotatable and vertically movable shafts having headlights, integral collars and laterally projecting lugs which normally bear on the cam-shaped edges of the sleeves, and means for allowing the vertical movement of said shafts moving them axially and returning them to their normal positions, comprising springs connected at their upper ends to said collars and at their lower ends to said sleeves, substantially as shown and described.

In testimony whereof I affix my signature in the presence of two witnesses.

LEWIS R. EWART.

Witnesses:
KATHARINE RUSSELL,
F. F. McGEE.